United States Patent [19]

Peterson et al.

[11] Patent Number: 5,146,424
[45] Date of Patent: Sep. 8, 1992

[54] DIGITAL ADDER HAVING A HIGH-SPEED LOW-CAPACITANCE CARRY BYPASS SIGNAL PATH

[75] Inventors: LuVerne R. Peterson, San Diego; Laurence P. Flora, Valley Center, both of Calif.

[73] Assignee: Unisys Corporation, Blue Bell, Pa.

[21] Appl. No.: 796,105

[22] Filed: Nov. 21, 1991

[51] Int. Cl.⁵ .............................................. G06F 7/50
[52] U.S. Cl. .................................................. 364/786
[58] Field of Search ........................... 364/786, 784

[56] References Cited

U.S. PATENT DOCUMENTS

| | | | |
|---|---|---|---|
| 4,031,379 | 6/1977 | Schwartz | 364/786 |
| 4,152,775 | 5/1979 | Schwartz | 364/786 |
| 4,422,157 | 12/1983 | Uhlenhoff | 364/786 |
| 4,425,623 | 1/1984 | Russell | 364/786 |
| 4,802,112 | 1/1989 | Yoshida et al. | 364/784 |
| 4,845,655 | 7/1989 | Yamada et al. | 364/786 |
| 5,025,409 | 6/1991 | Goto | 364/786 |

OTHER PUBLICATIONS

"High-Speed CMOS Logic Data Book", Texas Instruments, p. 2-369, 1987.
Kernhof et al., "High-Speed CMOS Adder and Multiplier Modules for Digital Signal Processing in a Semicustom Environment", IEEE Journal of Solid-State Circuits, vol.24, No. 3, Jun. 1989, pp. 570-575.

Primary Examiner—Tan V. Mai
Attorney, Agent, or Firm—Charles J. Fassbender; Mark T. Starr

[57] ABSTRACT

A digital adder module has a carry-in terminal, N pairs of data terminals, N sum terminals, and a carry-out terminal. A high-speed low-capacitance carry bypass signal path couples the carry-in terminal to the carry-out terminal. In one preferred embodiment, the capacitance of the bypass path is due solely to one transistor channel plus one transistor drain plus one internal logic gate plus interconnections between them.

17 Claims, 3 Drawing Sheets

DIGITAL ADDER HAVING A HIGH-SPEED LOW-CAPACITANCE CARRY BYPASS SIGNAL PATH

BACKGROUND OF THE INVENTION

This invention relates to the structure of digital circuits which add binary data bits; and more particularly, it relates to the structure of such adder circuits which operate a high speed.

In the prior art, digital adder circuits have been widely used. For example, they are used in the arithmetic units of general purpose digital computers, and they are also used in special purpose arithmetic modules such as a multiplier. In many of these applications, the speed at which the adder circuit operates is of critical importance.

Conventionally, digital adder circuits have been structured entirely of digital logic gates such as AND gates, NOR gates, EXCLUSIVE-OR gates, etc. One such adder circuit, for example, is the SN54HC283 which is sold by Texas Instruments. A logic diagram of that adder circuit is disclosed at page 2-369 of the "High-Speed CMOS Logic Data Book" from Texas Instruments, copyrighted 1987.

A problem, however, with an adder that is implemented entirely of logic gates is that the signal path from the carry-in terminal for the least significant data bits, to the carry-out terminal from the most significant data bits, goes through several logic gates in a series. Each logic gate imposes a certain time delay on the signal path, and thus the speed for generating the carry-out signal from the most significant data bits is limited by the serial gating.

Another structure in the prior art for a digital adder which avoids the above problem is disclosed in a technical paper entitled "High-Speed CMOS adder and Multiplier Modules for Digital Signal Processing in a Semicustom Environment" by Kershof et al, IEEE Journal of solid-state circuits, Vol. 24, No. 3, Jun. 1989, pages 570–575. In this paper, FIG. 5 shows a circuit diagram of a digital adder in which the signal path from the carry-in signal for the least significant bits, to the carry-out terminal from the most significant bits, goes through one input inverter and the channels of several transistors and one output inverter. A separate transistor channel is included for each pair of data bits being added. This adder circuit avoids the time delay through a serial string of logic gates by replacing it with a shorter time delay through a serial string of transistor channels.

Still another structure, in the prior art, of a digital adder which is a variation on the Kershof et al adder is disclosed in U.S. Pat. No. 5,025,409 by Goto issued Jun. 18, 1991. Various embodiments of the Goto adder are shown in his FIGS. 3 thru 9c; but, the gist of each of these embodiments is to provide a bypass circuit for the serial string of transistor channels. However, for each of the Goto embodiments, a signal path still exists from the carry-in terminal to the carry-out terminal which, in a certain worst case scenario, will have a large signal propagation delay.

For example, Goto's FIG. 3 embodiment includes three bypass circuits #1', #2', and #3'. In the case where each of those bypass circuits is active, the initial carry-in signal $C_0$ travels through a first carry circuit #1', then through bypass circuit #1', then through bypass circuit #2', and then through a last carry circuit #(L+2).

At the same time, however, the carry-in signal $C_0$ also travels through other circuits. Specifically, the carry-in signal $C_0$ travels through all of the carry circuits #2-#m, then through bypass circuit #3', and then through carry circuits #1-#(m+2). Each of those circuits has an inherent capacitance associated with the channel of a transistor (labeled 1 in FIG. 4a), and the total capacitance from those transistors in all of the circuits #2-#m, #3', and #1-#(m+2) is coupled to the output terminal of circuit #1. Consequently, the propagation delay from circuit #1 to circuit #1' is slowed down.

A similar capacitive loading problem also exists for all of Goto's embodiments. For example, in the embodiment of FIG. 7B, the bypass path for the carry-in signal $C_{i-1}$ goes through the channel of a bypass transistor (labeled 2) and through an inverter (not labeled) to form the carry-out signal $C_{i+3}$. At the same time however, the carry-in signal $C_{i-1}$ also goes through the channel of an extra transistor (labeled 1) to the input of an extra inverter (not labeled); and, the output from the channel of the bypass transistor 2 goes to the channel of another extra transistor (labeled 1). All of these extra components add capacitance to the bypass path, and that slows down the speed at which signals propagate along the bypass path.

Further, all of Goto's embodiments are incomplete in that they do not form any sum bits from the carry signals. To form those sum bits, EXCLUSIVE-OR gates need to be coupled to the channels of each of the transistors 1, and that adds even more capacitance to the bypass path. For example, in Goto's FIG. 7B embodiment, one EXCLUSIVE-OR gate would be added to the input of the leftmost transistor 1 and another EXCLUSIVE-OR gate would be added to the input of the rightmost transistor 1.

Accordingly, a primary object of the invention is to provide a digital adder circuit which overcomes the above described prior art problems and which operates faster than the prior art adders.

BRIEF SUMMARY OF THE INVENTION

A digital adder module, which uses the present invention, has data input terminals for receiving N pairs of data bit signals $A_1$ and $B_1$ thru $A_N$ and $B_N$, a carry-in terminal for receiving a carry-in signal, sum output terminals on which N sum bits are generated, and a carry-out terminals. To perform additions on any number of data bits, multiple modules are intercoupled in series with a respective inverter between the carry-out terminal and the carry-in terminal of successive modules. In accordance with the present invention, each module includes: a) a quasi carry circuit which generates a quasi carry-out signal that is valid only when at least one of the N data bit pairs are equal, and which presents no load to the carry-in signal; b) a control circuit which generates a first control signal indicating when at least one of the N data bit pairs are equal, which generates a second control signal that is the inverse of the first control signal, and which presents no load to the carry-in signal; c) a first transistor having a source connected to receive the quasi carry-out signal, a drain connected to the carry-out terminal, and a gate which receives the first control signal; d) a second transistor having a source connected to the carry-in terminal, a drain connected to the carry-out terminal, and a gate which receives the second control signal; and, e) a summing circuit which generates the sum bits from the data bits and the carry-in signal, and which presents a load of only a single inverter to the carry-in signal.

Due to the above structure, the capacitance of the signal path from the carry-in terminal to the carry-out terminal is: $C_{IN} = C_{CH} + C_{DR} + C_{SUM} + C_{LOAD} + C_{WIRE}$. In this expression, $C_{CH}$ is the channel capacitance of the second transistor; $C_{DR}$ is the drain capacitance of the first transistor; $C_{SUM}$ is the input capacitance of the single inverter in the summing circuit; $C_{LOAD}$ is the capacitance of the inverter between two successive modules; and $C_{WIRE}$ the capacitance of the interconnections between the identified components. Compared to the prior art, the capacitance $C_{IN}$ is small, and thus signals propagate from the carry-in terminal to the carry-out terminal with a high speed.

BRIEF DESCRIPTION OF THE DRAWINGS

Various preferred embodiments of the invention are described herein in conjunction with the accompanying drawings wherein.

DETAILED DESCRIPTION OF THE INVENTION

Figure 1:
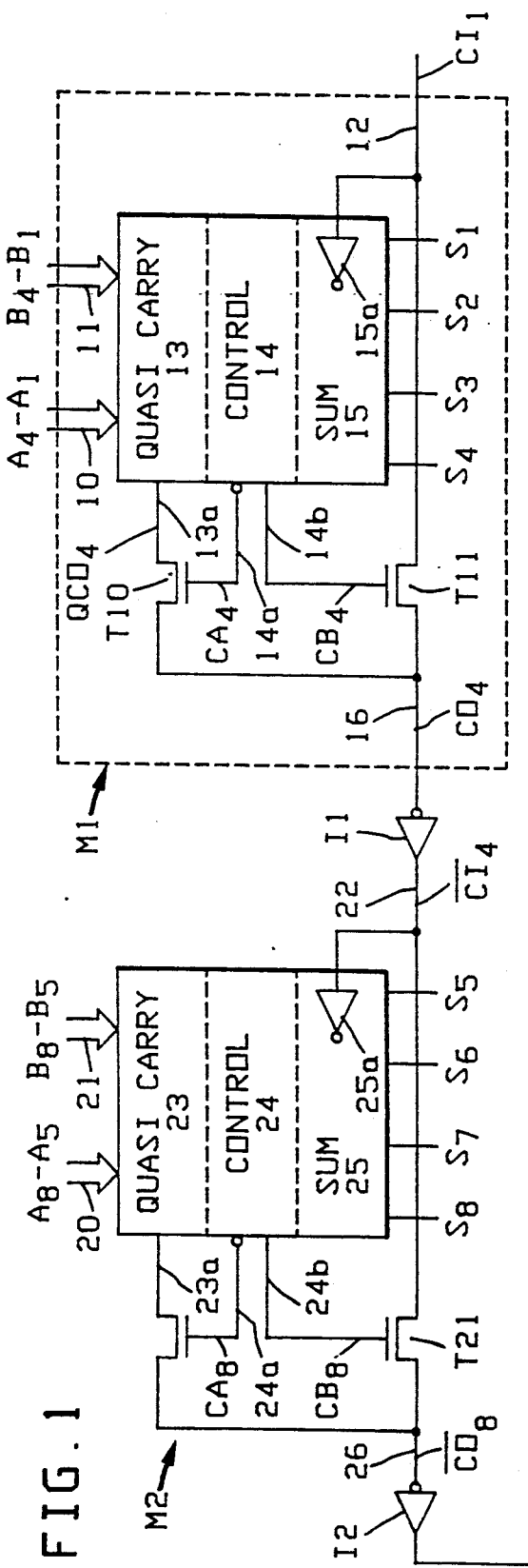
FIG. 1 shows an overview of one preferred embodiment of the invention.
Figure 1:
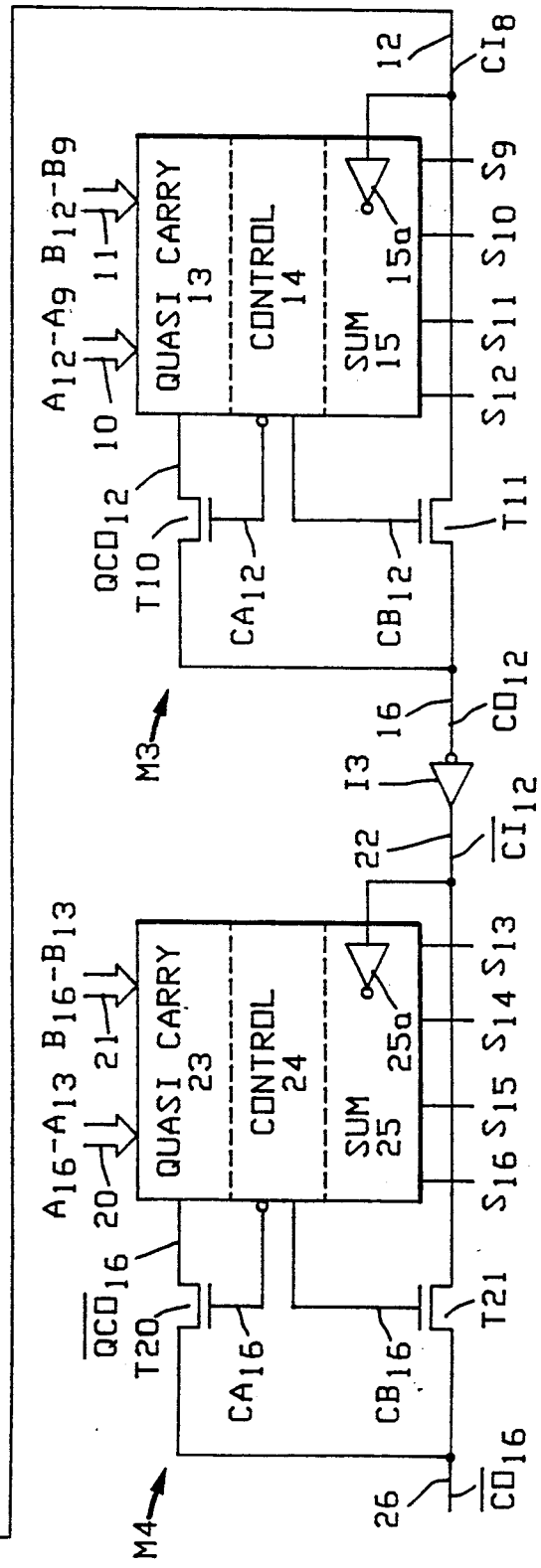

Referring now to FIG. 1, a preferred embodiment of a digital adder which is structured in accordance with the invention will be described in detail. In the FIG. 1 embodiment, the adder is a sixteen bit adder which is comprised of four modules M1, M2, M3, and M4. Modules M1 and M3 are identical in structure, and their internal circuits are shown in detail in FIG. 2. Modules M2 and M4 are also identical in structure, and their internal circuits are shown in detail in FIG. 3.

Module M1 has data input terminals 10 and 11, and it has a carry-in terminal 12. Four data bit signals $A_4$–$A_1$ are received on the input terminals 10; four data bit signals $B_4$–$B_1$ are received on the input terminals 11; and a single carry-in signal $CI_1$ is received on the input terminal 12. For these signals, a high voltage level (e.g.—5 volts) indicates a binary "1" and a low voltage level (e.g.—0 volts) indicates a binary "0". Signals A1 and B1 are the least significant bits; signals A2 and B2 are the next least significant bits; etc.

Module M1 further includes a quasi carry-out circuit 13, a control circuit 14, and a summing circuit 15. In operation, the quasi carry-out circuit 13 generates a quasi carry-out signal $QCO_4$ on a conductor 13a. Signal $QCO_4$ indicates the carry that is produced when just the data bits $A_4$–$A_1$ and $B_4$–$B_1$ are added (the carry-in signal on terminal 12 is ignored). Signal $QCO_4$ is valid only when at least one of the data bit pairs $A_1$ and $B_1$, $A_2$ and $B_2$, etc. are equal. For that case, a carry having a binary value of "1" is indicated by signal $QCO_4$ being a high voltage, and a binary value of "0" is indicated by a low voltage.

Control circuit 14 generates two control signals $CA_4$ and $CB_4$ on conductors 14a and 14b respectively. These control signals are functions of just the data bits on terminals 10 and 11, and not the carry-in signal on terminal 12. Specifically, signal $CA_4$ is high whenever at least one of the data bit pairs $A_1$ and $B_1$, $A_2$ and $B_2$, etc. are equal, and control signal $CB_4$ is the inverse of control signal $CA_4$.

Summing circuit 15 operates on the data bits on terminals 10 and 11 as well as the carry-in signal on terminal 12 to generate sum bits $S_4$ thru $S_1$. $S_1$ is the least significant sum bit; $S_2$ is the next least significant sum bit; etc. In performing the summing function, circuit 15 utilizes an inverter 15a as the only load that circuit 15 presents to the carry-in signal on terminal 12.

Further included in module M1 are two transistors T10 and T11. Transistor T10 has a source connected to conductor 13a to receive signal $QCO_4$, has a gate connected to conductor 14a to receive the control signal $CA_4$, and has a drain connected to a carry-out conductor 16 from module M1. Thus, transistor T10 passes the quasi carry-out signal $QCO_4$ to the carry-out terminal 16 whenever at least one of the data bit pairs $A_1$ and $B_1$, $A_2$ and $B_2$, etc. are equal. For all other cases, transistor T10 decouples conductor 13a from the carry-out terminal 16.

Transistor T11 has a source connected to the carry-in terminal 12, has a gate connected to conductor 14b to receive control signal $CB_4$, and has a drain connected to the carry-out terminal 16. Thus transistor T11 passes the carry-in signal $CI_1$ to the carry-out terminal 16 whenever all of the data bit pairs are not equal. For all other cases, transistor T11 decouples the carry-in terminal 12 from the carry-out terminal 16.

An important feature which results from the above structure is that the signal path from the carry-in terminal 12 through transistor T10 to the carry-out terminal 16 has a very small capacitive loading. This capacitive loading is due solely to the single logic gate 15a, the channel of transistor T11, the drain of transistor T10, the input terminal of an inverter I1 that is connected to the output terminal 16, and any parasitic capacitance of the conductors which interconnect those components. Since that capacitive loading is small, signal $CI_1$ on the input terminal 12 propagates rapidly to the output terminal 16 as signal $CO_4$ whereupon it is available for use by the remainder of the FIG. 1 adder.

Considering now module M2, it includes four data input terminals 20 which receive data bits $A_8$–$A_5$, four data input terminals 21 which receive data bits $B_8$–$B_5$, a carry-in terminal 22, a quasi carry-out circuit 23, a control circuit 24, a summing circuit 25, a pair of transistors T20 and T21, and a carry-out terminal 26. All of those components are interconnected as shown.

Components 20 thru 26 of module M2 are similar to, but not the same as, the previously described components 10 thru 16 of module M1, and similar components have the same reference numeral minus ten. For example, circuit 23 is similar to circuit 13, and circuit 25 is similar to circuit 15.

One difference between module M2 and module M1 is that in module M2, the carry-in signal on input terminal 22 is low (rather than high) when the carry-in is a binary "1". This carry-in signal is labeled $\overline{CI_4}$. Also, the carry-out signal $CO_8$ on output terminal 26 is low (rather than high) when the carry-out from module M2 is a binary "1". Further, the quasi carry-out signal on conductor 23a is low (rather than high) when a carry-out having a binary value of "1" is generated if just the data bits $A_8$–$A_5$ and $B_8$–$B_5$ are added. This quasi carry-out signal is labeled $\overline{QCO_8}$.

By comparison, the modules M2 and M1 are similar in that the signal path from the carry-in terminal 22 through transistor T21 to the carry-out terminal 26 has very small capacitive loading. Specifically, that capacitive loading is due solely to the single logic gate 25a, the channel of transistor T21, the drain of transistor T20, the input terminal of an inverter 12 which is connected to the carry-out terminal 26, and the conductive interconnections between those components. Due to this capacitive loading being small, the carry-in signal on conductor 22 propagates rapidly to the carry-out terminal 26 whereupon it is available for use by the remainder of the adder.

In the FIG. 1 adder, modules M1, M2, and M3 have their carry-out terminal coupled thru respective inverters I1, I2, I3 to the carry-in terminal of the next succeeding module. Consequently, the total propagation delay from the carry-in terminal 12 of the first module M1 to the carry-in terminal 22 of the last module M4 is simply the delay thru the three inverters I1, I2, and I3 plus the above described delays through each of the modules M1, M2, and M3. Thus, the carry-in signal to the last module M4 becomes available quickly, and that in turn quickly enables the summing circuit 25 in the last module to begin to perform the last addition on the data bit,- $A_{13}$-$A_{16}$ and $B_{16}$.

A mathematical expression for the capacitance from the carry-in terminal 12 to the carry-out terminal 16 in modules M1 and M3 is: $C_{IN}=C_{CH}+C_{SUM}+C_{DR}+C_{LOAD}+C_{WIRE}$. In this expression, $C_{IN}$ is the input capacitance of one carry-in terminal; $C_{CH}$ is the channel capacitance of transistor T11; $C_{DR}$ is the drain capacitance of transistor T10; $C_{SUM}$ is the capacitance of inverter 15a in the summing circuit 15; $C_{LOAD}$ is the capacitance of inverter I1; and $C_{WIRE}$ is the capacitance of the interconnections between the above components. An expression for the input capacitance of the carry-in terminal 22 of each of the modules M2 and M4 is similar.

If inverter 15a, 25a, I1 or I2 is a CMOS inverter, then the capacitance of that inverter is the gate capacitance of one P-channel transistor plus the gate capacitance of one N-channel transistor. Inverter 15a, for example, is shown as a CMOS inverter in FIG. 2. On the other hand, if inverter 15a, 25a, I1, or I2 is a NMOS inverter, then the capacitance of that inverter is just the gate capacitor of one N-channel transistor. Inverter 25a, for example, is shown as an NMOS of inverter in FIG. 3.

Figure 2:
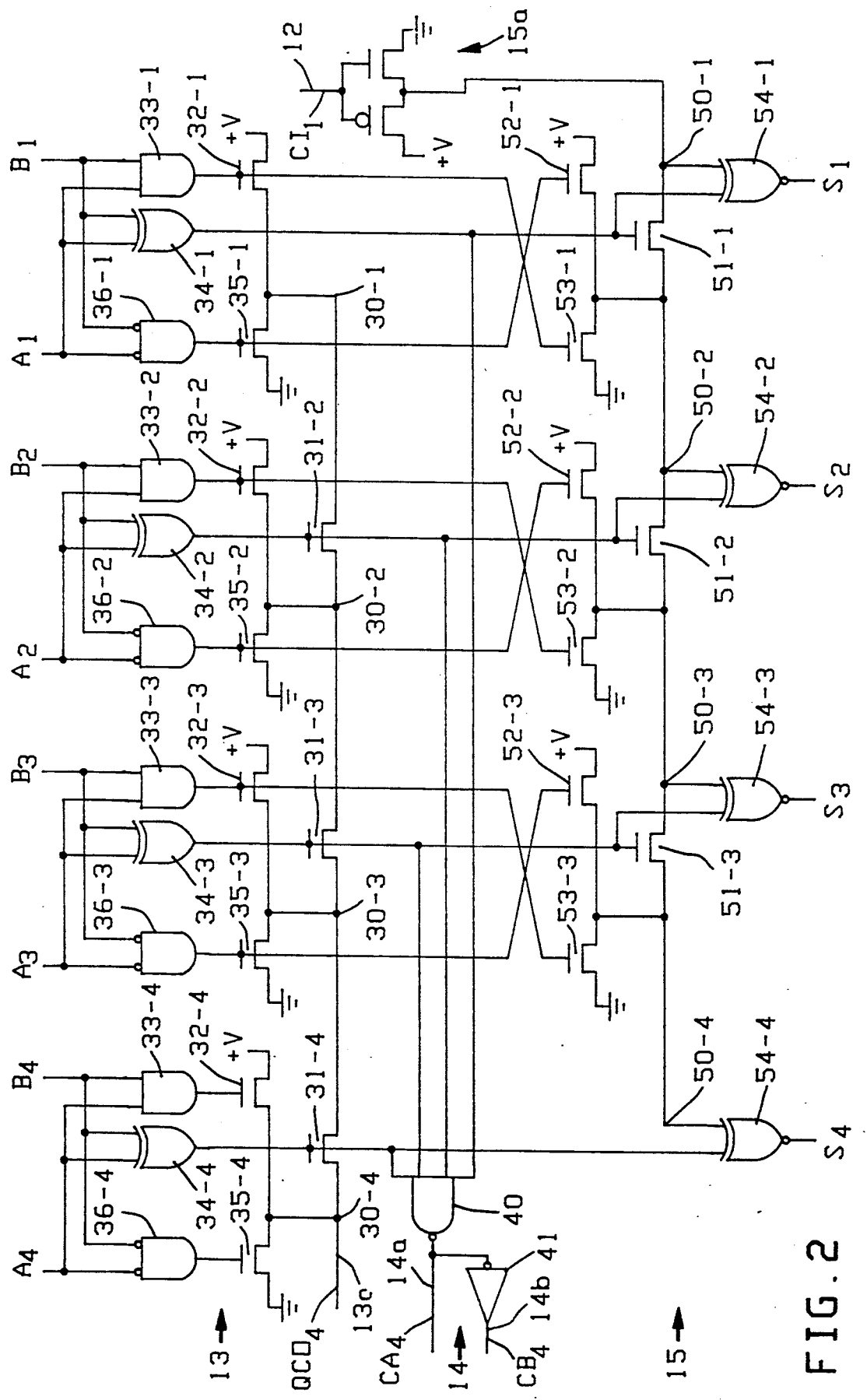
FIG. 2 shows a detailed circuit diagram of two modules M1 and M3 in the FIG. 1 embodiment; and, FIG. 3 shows a detailed circuit diagram of two other modules M2 and M4 in the FIG. 1 embodiment.

For transistors having a 1um channel length, practical numerical values for each of the above capacitances are as follows:

$C_{CH}$=25 femtofarads
$C_{DR}$=15 femtofarads
$C_{SUM}$=75 femtofarads for CMOS inverter
$C_{SUM}$=45 femtofarads for NMOS inverter
$C_{LOAD}$=170 femtofarads for CMOS inverter
$C_{LOAD}$=100 femtofarads for NMOS inverter
$C_{WIRE}$=55 femtofarads Turning now to FIG. 2, additional details of the quasi carry-out circuit 13, the control circuit 14, and the summing circuit 15 in module M1 will be described. Beginning first with the quasi carry-out circuit 13, it includes four nodes 30-1, 30-2, 30-3, and 30-4; and, those nodes are serially intercoupled through the channels of respective 35 transistors 31-2, 31-3, and 31-4. Conductor 13a, on which the quasi carry-out signal $QCO_4$ is generated, is connected to node 30-4. Circuit 13 further includes four transistors 32-1 thru 32-4, four AND gates 33-1 thru 33-4, four EXCLUSIVE-OR gates 34-1 thru 34-4, four transistors 35-1 thru 35-4, and four NOR gates 36-1 thru 36-4. All of these components are interconnected as illustrated.

In operation, transistor 32-1 is turned ON by AND gate 33-1 when the data bits $A_1$ and $B_1$ both equal a binary "1"; and, that in turn causes node 30-1 to be charged to a high voltage. This high voltage represents a carry bit of "1" from the addition of bit $A_1$ to bit $B_1$. Conversely, transistor 35-1 is turned ON by NOR gate 36-1 when the $A_1$ and $B_1$ data bits are both a binary "0"; and that in turn discharges node 30-1 to a low voltage. This low voltage represents a carry of a binary "0" from the addition of the $A_1$ and $B_1$ data bits.

Transistor 31-2 is turned ON by the exclusive OR gate 34-2 when the $A_2$ and $B_2$ data bits are not equal. In that case, the carry as represented by the voltage on node 30-1 is propagated to node 30-2. On the other hand, if the $A_2$ and $B_2$ data bits both are a "1", then transistor 32-2 is turned ON by AND gate 33-2; and that charges node 30-2 to a high voltage. Conversely, if the $A_2$ and $B_2$ and data bits both are a binary "0", then NOR gate 36-2 turns on transistor 35-2, which in turn discharges node 30-2 to a low voltage.

With respect to the data bits $A_3$ and $B_3$, all of the components 31-3 thru 36-3 operate the same as the above described components 31-2 thru 36-2. For example, transistor 31-3 propagates the carry as represented by the voltage on node 30-2 to node 30-3 when the data bits $A_3$ and $B_3$ are not equal to each other. Likewise, with respect to the data bits $A_4$ and $B_4$, all of the components 31-4 thru 36-4 operate the same as components 31-2 thru 36-2.

Next, considering control circuit 14, it includes a NAND gate 40 and an inverter 41 which are interconnected as illustrated. Control signal $CA_4$ on conductor 14a is generated by the NAND gate 40; and control signal $CB_4$ on conductor 14b is generated by the inverter 41. NAND gate 40 performs a NAND operation on the output signals from the four exclusive OR gates 34-1 thru 34-4. Thus, the output of NAND gate 40 is low when all of the data bit pairs are unequal. If any pair of data bits are equal (e.g.—$A_1$=$B_1$), then control signal $CA_4$ is high.

Considering now the summing circuit 15, it includes four nodes 50-1, 50-2, 50-3, and 50-4 which are serially intercoupled through the channels of respective transistors 51-2, 51-3, and 51-4. Node 50-1 is driven by the output of inverter 15a, and that inverter is the only logic gate load which the entire module M1 presents to the carry-in terminal 12. Further included in the summing circuit 15 are three transistors 52-1 thru 52-3, three additional transistors 53-1 thru 53-3, and four EXCLUSIVE-NOR gates 54-1 thru 54-4. All of those components are interconnected as shown.

In operation, the inverter 15a generates a low voltage on node 50-1 when the carry-in signal $CI_1$ on conductor 12 is a binary "1"; and vice versa. Then, the voltage on node 50-1 is propagated to node 50-2 by transistor 51-1 if the data bits A and B are not equal. On the other hand, if both of the data bits $A_1$ and $B_1$ are a binary "1", then transistor 53-1 turns ON and discharges node 50-2 to a low voltage. Conversely, if both of the data bits $A_1$ and $B_1$ are a binary "0", then transistor 52-1 turns ON and charges node 50-2 to a high voltage.

In the same fashion but in response to the data bits $A_2$ and $B_2$, transistors 51-2 thru 53-2 charge and discharge node 50-3. For example, transistor 51-2 transfers the voltage on node 50-2 to node 50-3 when both of the data bits $A_2$ and $B_2$ are different from each other. Likewise, transistors 51-3 thru 53-3 operate in response to the data bits $A_4$ and $B_4$ to charge and discharge node 50-4.

To form the sum bit S, the EXCLUSIVE-NOR gate 54-1 performs an EXCLUSIVE-NOR operation on the signal at node 50-1 and the output signal from logic gate 34-1. Each of the remaining sum bits $S_2$, $S_3$ and $S_4$ are respectively formed by the exclusive NOR gates 54-2, 54-3, and 53-4 in the same manner. For example, the sum bit $S_3$ is formed by an EXCLUSIVE-NOR operation on the signal on node 50-3 and the output signal from logic gate 34-3.

An important feature that results from the above described structure of module M1 is that the capacitive loading on the quasi-carry circuit nodes 30-1 thru 30-4 is small; and thus, the signals propagate from one of those nodes to the next node quickly. As a result, the quasi-carry signal $QCO_4$ is generated quickly. This small capacitive loading occurs because the carry-in signal $CI_1$ is not coupled to the nodes 30-1 thru 30-4, and because those nodes are not used to form the sum bits $S_1$–$S_4$. That is, the nodes 30-1 thru 30-4 are decoupled from the exclusive-NOR gates 54-1 thru 54-4 in the summing circuit, and each such gate has an inherent input capacitance.

Figure 3:
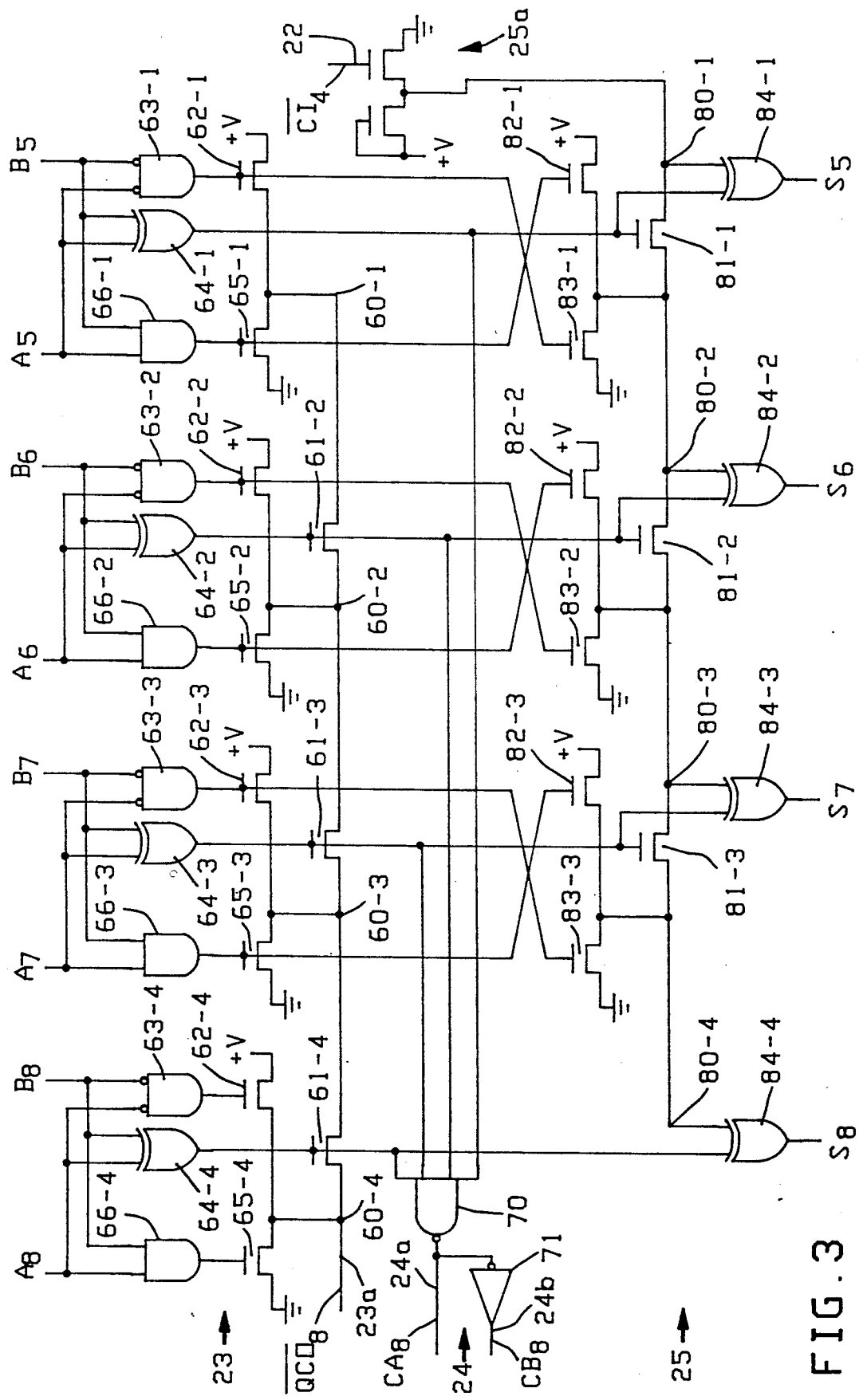

Referring next to FIG. 3, additional details of the quasi carry-out circuit 23, the control circuit 24, and the summing circuit 25 in module M2 will be described. In general, module M2 is similar to module M1, but there are several subtle differences.

In module M2, the quasi carry-out circuit 23, includes four nodes 60-1, 60-2, 60-3, and 60-4; and, those nodes are serially intercoupled through the channels of respective transistors 61-2, 61-3, and 61-4. Conductor 23a, on which the quasi carry-out signal $\overline{QCO}_8$ is generated, is connected to node 60-4. Circuit 23 further includes four transistors 62-1 thru 62-4, four NOR gates 63-1 thru 63-4, four EXCLUSIVE-OR gates 64-1 thru 64-4, four transistors 65-1 thru 65-4, and four AND gates 66-1 thru 66-4. All of these components are interconnected as illustrated.

Transistor 62-1 is turned ON by NOR gate 63-1 when the data bits $A_5$ and $B_5$ both equal a binary "0"; and, that in turn causes node 60-1 to be charged to a high voltage. This high voltage represents a carry bit of "0" from the addition of bit $A_5$ to bit $B_5$. Conversely, transistor 65-1 is turned ON by AND gate 66-1 when the $A_5$ and $B_5$ data bits are both a binary "1"; and that in turn discharges node 60-1 to a low voltage. This low voltage represents a carry of a binary "1" from the addition of the $A_5$ and $B_5$ data bits.

Transistor 61-2 is turned ON by the exclusive OR gate 64-2 when the $A_6$ and $B_6$ data bits are not equal. In that case, the carry as represented by the voltage on node 60-1 is propagated to node 60-2. On the other hand, if the $A_6$ and $B_6$ data bits both are a "0", then transistor 62-2 is turned ON by NOR gate 63-2; and that charges node 60-2 to a high voltage. Conversely, if the $A_6$ and $B_5$ data bits both are a binary "1", then NOR gate 66-2 turns on transistor 65-2, which in turn discharges node 60-2 to a low voltage.

With respect to the data bits $A_7$ and $B_7$, all of the components 61-3 thru 66-3 operate the same as the above described components 61-2 thru 66-2. For example, transistor 61-3 propagates the carry as represented by the voltage on node 60-2 to node 60-3 when the data bits $A_7$ and $B_7$ are not equal to each other. Likewise, with respect to the data bits $A_8$ and $B_8$, all of the components 61-4 thru 66-4 operate the same as components 61-2 thru 66-2.

Next, considering control circuit 24, it includes a NAND gate 70 and an inverter 71 which are interconnected as illustrated. Control signal $CA_8$ on conductor 24a is generated by the NAND gate 70; and control signal $CB_8$ on conductor 24b is generated by the inverter 71. NAND gate 70 performs a NAND operation on the output signals from the four exclusive OR gates 64-1 thru 64-4. Thus, the output of NAND gate 70 is low when all of the data bit pairs $A_5$ and $B_5$, $A_6$ and $B_6$, etc. are unequal. If any pair of data bits are equal (e.g. $A_5 = B_5$), then control signal $CA_8$ is high.

Lastly, considering the summing circuit 25, it includes four nodes 80-1, 80-2, 80-3, and 80-4 which are serially intercoupled through the channels of respective transistors 81-1, 81-2, and 81-3. Node 80-1 is driven by the output of inverter 25a, and that inverter is the only logic gate load which the entire module M2 presents to the carry-in terminal 22. Further included in the summing circuit 25 are three transistors 82-1 thru 82-3, three additional transistors 83-1 thru 83-3, and four EXCLUSIVE-OR gates 84-1 thru 84-4. All of those components are interconnected as shown.

In operation, the inverter 25a generates a high voltage on node 80-1 when the carry-in signal on conductor 22 is a binary "1"; and vice versa. Then, the voltage on node 80-1 is propagated to node 80-2 by transistor 81-1 if the data bits $A_5$ and $B_5$ are not equal. On the other hand, if both of the data bits $A_5$ and $B_5$ are a binary "0", then transistor 83-1 turns ON and discharges node 80-2 to a low voltage. Conversely, if both of the data bits $A_5$ and $B_5$ are a binary "1", then transistor 82-1 turns ON and charges node 80-2 to a high voltage.

In the same fashion, but in response to the data bits $A_6$ and $B_6$, transistors 81-2 thru 83-2 charge and discharge node 80-3. For example, transistor 81-2 transfers the voltage on node 80-2 to node 80-3 when both of the data bits $A_6$ and $B_6$ are different from each other. Likewise, transistors 81-3 thru 83-3 operate in the same fashion, but in response to the data bits $A_7$ and $B_7$ to charge and discharge node 80-4.

To form the sum bit $S_5$, the EXCLUSIVE-OR gate 84-1 performs an EXCLUSIVE-OR operation on the signal at node 80-1 and the output signal from logic gate 64-1. Each of the remaining sum bits $S_6$, $S_7$, and $S_8$ are respectively formed by the EXCLUSIVE-OR gates 84-2, 84-3, and 83-4 in a similar manner. For example, the sum bit $S_7$ is formed by an EXCLUSIVE-OR operation on the signal on node 80-3 and the output signal from logic gate 64-3.

With the above described structure of module M2, the capacitive loading on the quasi-carry circuit nodes 60-1 thru 60-4 is small; and thus, the signals propagate from one of those nodes to the next node quickly. This small capacitive loading occurs because the carry-in signal on terminal 22 is not coupled to the nodes 60-1 thru 60-4, and because those nodes are not coupled to the EXCLUSIVE-OR gates 84-1 thru 84-4 in the summing circuit.

Various preferred embodiments of the invention have now been described in detail. In addition, however, many changes and modifications can be made to these embodiments without departing from the nature and spirit of the invention. For example, in the modules M1–M4, the nodes 30-1, 30-2, etc. and their associated circuitry may be increased in number; and, they may also be decreased in number. Preferably, the number of these nodes per module ranges from three to nine. With less than three nodes 30-1, 30-2, etc. per module, the increase in speed that is obtained via the bypass transistor T11 becomes too small; and with more than nine nodes 30-1, 30-2, etc. per module, the edge rate of the quasi carry-out signal QCO4 becomes too slow. Likewise, the number of nodes 50-1, 50-2, etc. and their associated circuitry per module preferably ranges from three to nine. Also, the number of data bits which can be added together with the modules M1 and M2 is not limited to sixteen; any number of data bits can be added by simply using more modules.

Accordingly, it is to be understood that the invention is not limited to the preferred embodiment but is defined by the appended claims.

What is claimed is:

1. A digital adder module comprising:
   data input terminals for receiving N pairs of data bit signals $A_N$ and $B_N$ thru $A_1$ and $B_1$, and a carry-in terminal for receiving a carry-in signal;
   a quasi carry means for generating a quasi carry-out signal that is valid only when the data bits of at least one of said N pairs are equal, and which presents no load to said carry-in signal;
   a control means, for generating a first control signal indicating when the data bits of at least one of said N pairs are equal, for generating a second control signal which is the inverse of said first control signal, and which presents no load to said carry-in signal;
   a first transistor having a source connected to receive said quasi carry-out signal, a drain connected to a carry-out terminal, and a gate which receives said first control signal;
   a second transistor having a source connected to said carry-in terminal, a drain connected to said carry-out terminal, and a gate which receives said second control signal; and,
   a summing means for generating N sum bits from said data bits and said carry-in signal, and which presents a load of only a single logic gate to said carry-in signal.

2. A digital adder module according to claim 1 wherein said quasi carry means includes: N nodes $N_1$ thru $N_N$ that are serially intercoupled through respective channels of $N-1$ transistors $T_2$ thru $T_N$, voltage propagate means for turning-ON transistor $T_i$ when $A_i = B_i$ where i ranges from 2 to N, and voltage generate means for generating a high voltage on node $N_i$ if $A_i = B_i = 1$ and for generating a low voltage if $A_i = B_i = 0$ where i ranges from 1 to N.

3. A digital adder module according to claim 2 wherein said summing means includes: N nodes $N_1$ thru $N_N$ that are serially intercoupled through respective channels of $N-1$ transistors $T_1$ thru $T_{N-1}$, voltage propagate means for turning-ON transistor $T_1$ when $A_i = B_i$ where i ranges from 1 to $N-1$, voltage generate means for generating a low voltage on node $N_1$ if $A_i = B_i = 1$ and for generating a high voltage if $A_i = B_i = 0$ where i ranges from 1 to N, and EXCLUSIVE-NOR means, coupled to said nodes of said summing means and decoupled from said nodes of said quasi-carry means, which generates said sum bits.

4. A digital adder module according to claim 3 wherein said carry-in terminal is coupled to said node $N_1$ of said summing means by said single logic gate.

5. A digital adder module according to claim 4 wherein said single logic gate is a NMOS inverter.

6. A digital adder module according to claim 4 wherein said single logic gate is a CMOS inverter.

7. A digital adder module according to claim 4 wherein N ranges from three to nine.

8. A digital adder module according to claim 1 wherein said quasi carry means includes: N nodes $N_1$ thru $N_N$ that are serially intercoupled through respective channels of $N-1$ transistors $T_2$ thru $T_N$, voltage propagate means for turning-ON transistor $T_i$ when $A_i = B_i$ where i ranges from 1 to N, and voltage generate means for generating a high voltage on node $N_i$ if $A_i = B_i = 0$ and for generating a low voltage if $A_i = B_i = 1$ where i ranges from 1 to N.

9. A digital adder module according to claim 8 wherein said summing means includes: N nodes $N_1$ thru $N_N$ that are serially intercoupled through respective channels of $N-1$ transistors $T_1$ thru $T_{N-1}$, voltage propagate means for turning-ON transistor $T_i$ when $A_i = B_i$ with i ranging from 1 to $N-1$, voltage generate means for generating a high voltage on node $N_i$ if $A_i = B_i = 1$ and for generating a low voltage if $A_i = B_i = 0$ where i ranges from 1 to N, and EXCLUSIVE-OR means coupled to said nodes of said summing means and decoupled from said nodes of said quasi-carry means, which generates said sum bits.

10. A digital adder module according to claim 9 wherein said carry-in terminal is coupled to said node $N_1$ of said summing means by said single logic gate.

11. A digital adder module according to claim 10 wherein said single logic gate is a NMOS inverter.

12. A digital adder module according to claim 10 wherein said single logic gate is a CMOS inverter.

13. A digital adder module according to claim 10 wherein N ranges from three to nine.

14. A digital adder module according to claim 1 in combination with multiple other digital adder modules, each of which is structured in accordance with claim 1; and, all of said modules being arranged in a series with the carry-out terminal of all but the last module in said series module being connected through a respective inverter to the carry-in terminal of the next module in said series.

15. A digital adder module in combination with multiple other digital adder modules according to claim 14 wherein each instance of said single logic gate and each instance of said respective inverter is an NMOS inverter.

16. A digital adder module in combination with multiple other digital adder modules according to claim 14 wherein each instance of said single logic gate and each instance of said respective inverter is an CMOS inverter.

17. A digital adder module in combination with multiple other digital adder modules according to claim 14 wherein N in each module ranges from three to nine.

* * * * *